(12) United States Patent
Smith et al.

(10) Patent No.: US 11,079,306 B1
(45) Date of Patent: Aug. 3, 2021

(54) VARIABLE SOIL SAMPLING DEVICE

(71) Applicant: SKC Inc., Eighty Four, PA (US)

(72) Inventors: Donald Lee Smith, West Newton, PA (US); Linda Coyne, Pittsburgh, PA (US)

(73) Assignee: SKC Inc., Eighty Four, PA (US)

( * ) Notice: Subject to any disclaimer, the term of this patent is extended or adjusted under 35 U.S.C. 154(b) by 258 days.

(21) Appl. No.: 15/923,751

(22) Filed: Mar. 16, 2018

Related U.S. Application Data

(60) Provisional application No. 62/472,774, filed on Mar. 17, 2017.

(51) Int. Cl.
*G01N 1/22* (2006.01)

(52) U.S. Cl.
CPC ......... *G01N 1/2294* (2013.01); *G01N 1/2214* (2013.01)

(58) Field of Classification Search
CPC ...... G01N 1/22; G01N 1/2214; G01N 1/2294; G01N 33/24; E02D 1/00; E02D 1/04; E21B 49/00
USPC ...... 73/863.23, 863.25, 863.31, 864, 864.51, 73/864.63, 864.64
See application file for complete search history.

(56) References Cited

U.S. PATENT DOCUMENTS

| | | | | |
|---|---|---|---|---|
| 2,345,219 A | * | 3/1944 | Sanderson | G01V 9/007 436/29 |
| 5,641,642 A | * | 6/1997 | Peyton | G01N 33/1866 435/30 |

* cited by examiner

*Primary Examiner* — Benjamin R Schmitt
(74) *Attorney, Agent, or Firm* — The Webb Law Firm

(57) ABSTRACT

Disclosed herein is a variable soil sampling device which may be customized with respect to sampling rate and sorbent material used. Multiple variable sampling devices may be attached to each other to simultaneously sample different components or contaminants in the same time period.

20 Claims, 8 Drawing Sheets

VARIABLE SOIL SAMPLING DEVICE

CROSS-REFERENCE TO RELATED APPLICATIONS

This application claims the benefit of United States provisional patent application No. 62/472,774 filed Mar. 17, 2017, which is hereby incorporated by reference in its entirety.

BACKGROUND OF THE INVENTION

Field of the Invention

The present invention relates generally to devices use to sample soil.

Description of Related Art

Soil testing is an important diagnostic tool for environmental assessments. Soil testing can also be used to identify application rates of waste materials containing nutrients or other elements that could harm the environment. Soil testing is required in many regulations and management guidelines to assess environmentally harmful levels of certain compounds. In particular, soil gas sampling is a valuable screening method to determine the presence, composition, and origin of underground contaminants such as volatile organic compounds (VOCs). Soil gas surveys are often used to locate nonaqueous phase liquids (NAPLs), which are organic liquids or wastes that are sufficiently immiscible in water such that they may persist as a separate phase in the subsurface for many years.

Soil gas sampling may be accomplished in a variety of ways, including active and passive. Examples of active sampling methods include using a gas probe connected to a pumping system to pull the gas out of the soil and removal of the gas for later laboratory analysis. Passive sampling may be accomplished by exposing a sorbent material to the soil environment to be sampled and allowing gas samples to be collected over time. That sorbent material may then be analyzed for its content. The success of such techniques depends greatly on the ability to collect samples in such a passive way. Sampling conditions must be optimized for maximum sampling collection. For example, the depth of the sampling probe, the chemical efficiency of the sorbent material to collect the target component, and the permeability of the housing in which it is enclosed all play an important role in determining accuracy of soil gas measurements. Further, often multiple different target components are identified for testing in a single soil site or environment. Each component will have a set of ideal sampling conditions which may be difficult to achieve quickly and with a single sampling probe.

The present invention provides a versatile yet simple sampling system that may be easily customized to analyze a number different target components in the same collection period.

SUMMARY OF THE INVENTION

The present invention provides a variable sampling device having a sampling body, a removably connected barrier door that may be removed to reveal a space or opening where sorbent material may be placed. The sampling body further has a mechanism for interlocking with another variable sampling device, such that one or more variable sampling devices may be attached. Further the barrier door has holes which may be varied in size and number to provide a desired permeability to the variable sampling device. By using different sorbents in each variable sampling device as well as varying the permeability of the barrier door, a wide variety of target components may be sampled.

The present invention also provides a method for using said variable sampling device, which includes inserting a sorbent into one or more variable sampling devices, attaching one or more variable sampling devices together, and exposing the one or more variable sampling devices to the sampling environment. In some embodiments, variable sampling devices are connected end-to-end and aligned a long a center axis and are placed down a hole or a pipe. This may be accomplished by attaching a rope, chain, or other similar material to the top of the uppermost variable sampling device. Optionally, other elements may be attached, such as a weight, to the bottom of a variable sampling device. Each component may be attached via the same interlocking mechanism used to attach one variable sampling device to another.

BRIEF DESCRIPTION OF THE SEVERAL VIEWS OF THE DRAWINGS

Further aspects of the present disclosure together with additional features contributing thereto and advantages accruing there from will be apparent from the following description of embodiments of the disclosure which are shown in the accompanying drawing figures wherein.

DETAILED DESCRIPTION OF THE INVENTION

The invention will be described with respect to FIGS. 1 through 8. It should be understood, however, that these figures are an example of a particular embodiment and that there exist many more embodiments that encompass the characteristics disclosed and described herein. While the following description discloses exemplary embodiments, the scope of the present patent application is not limited to the disclosed embodiments, but also encompasses combinations of the disclosed embodiments, as well as modifications to the disclosed embodiments as well as other embodiments.

It is often desirable to measure different components of an environmental sample, for example, the air, soil, or water, to detect contamination or other materials that may be present. The present invention provides a variable sampling device for environmental sampling.

Figure 1:
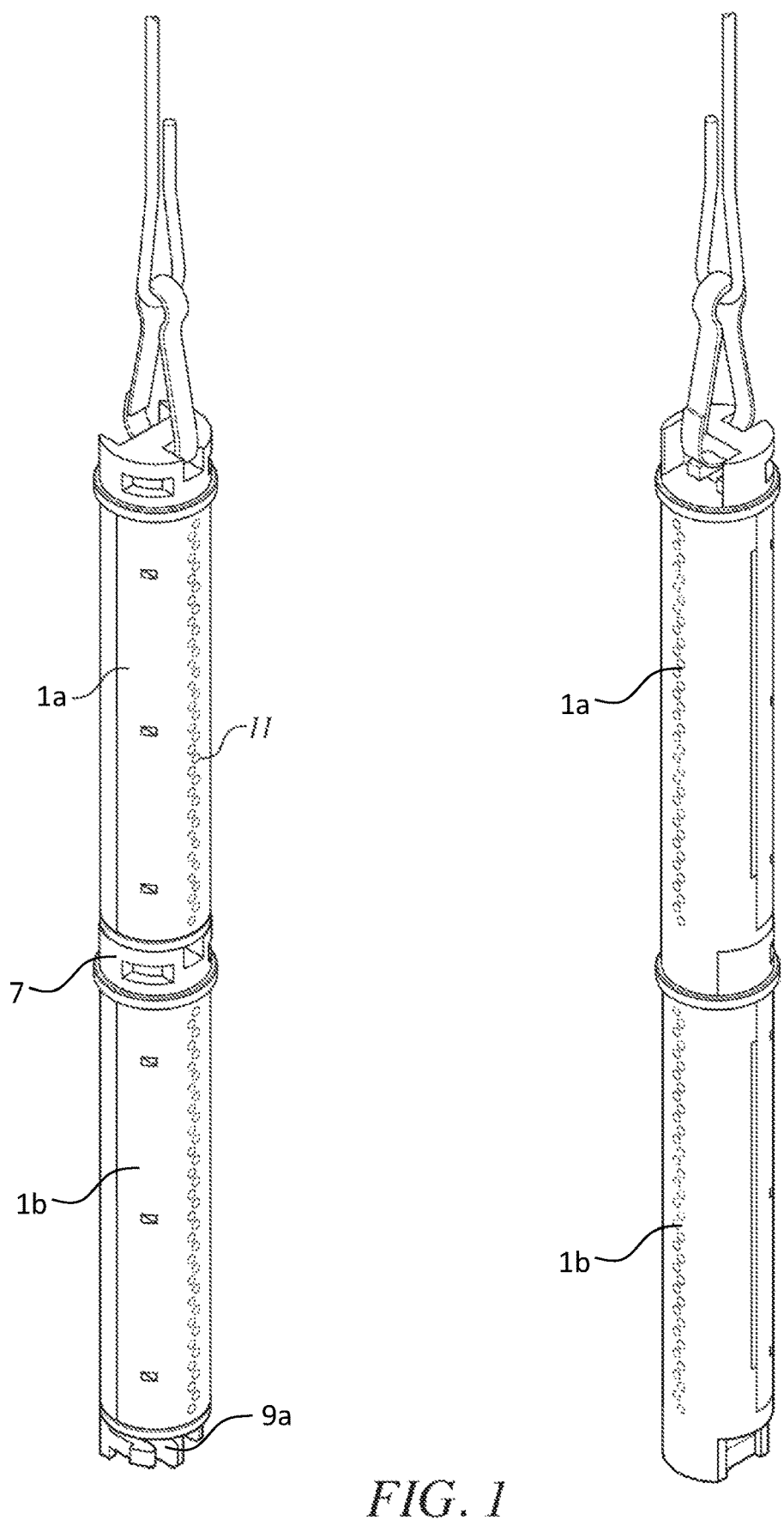
FIG. 1 shows a front and a back view of one embodiment of the variable sampling device.

FIG. 1 shows one embodiment of a variable sampling device as contemplated by the present invention. As depicted, FIG. 1 shows two variable sampling devices 1a and 1b, connected to one another by a connecting mechanism 7. The bottom variable sampling device 1b has a connector 9a to optionally connect to a third variable sampling device (not pictured). Notably, each variable sampling device exhibits holes 11 through which air or other gasses may flow.

Figure 2:
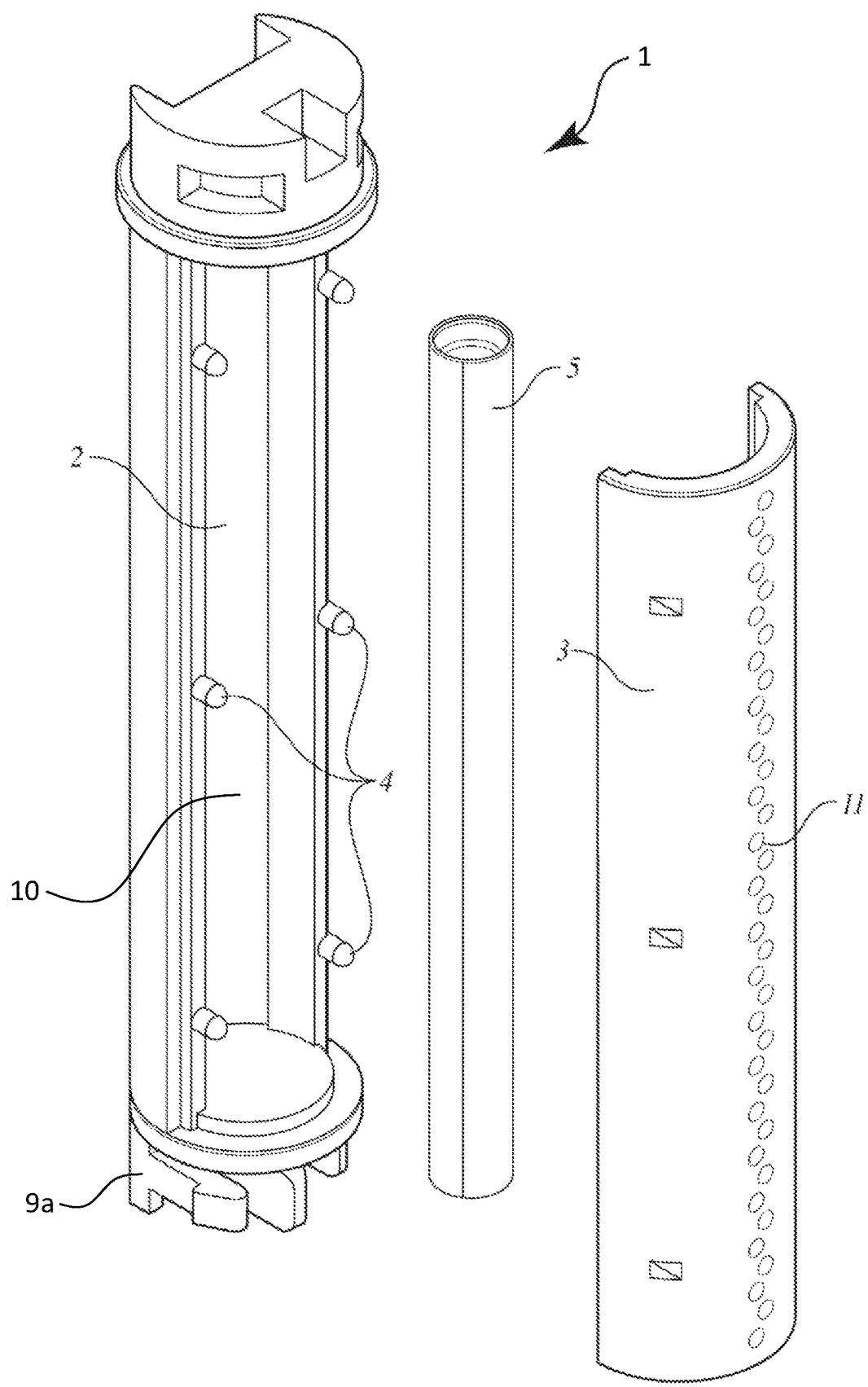
FIG. 2 shows one embodiment of a dissembled variable sampling device consisting of a sampling body, barrier door, and an example of a sorbent material that may be placed within the sampling body.
Figure 3:
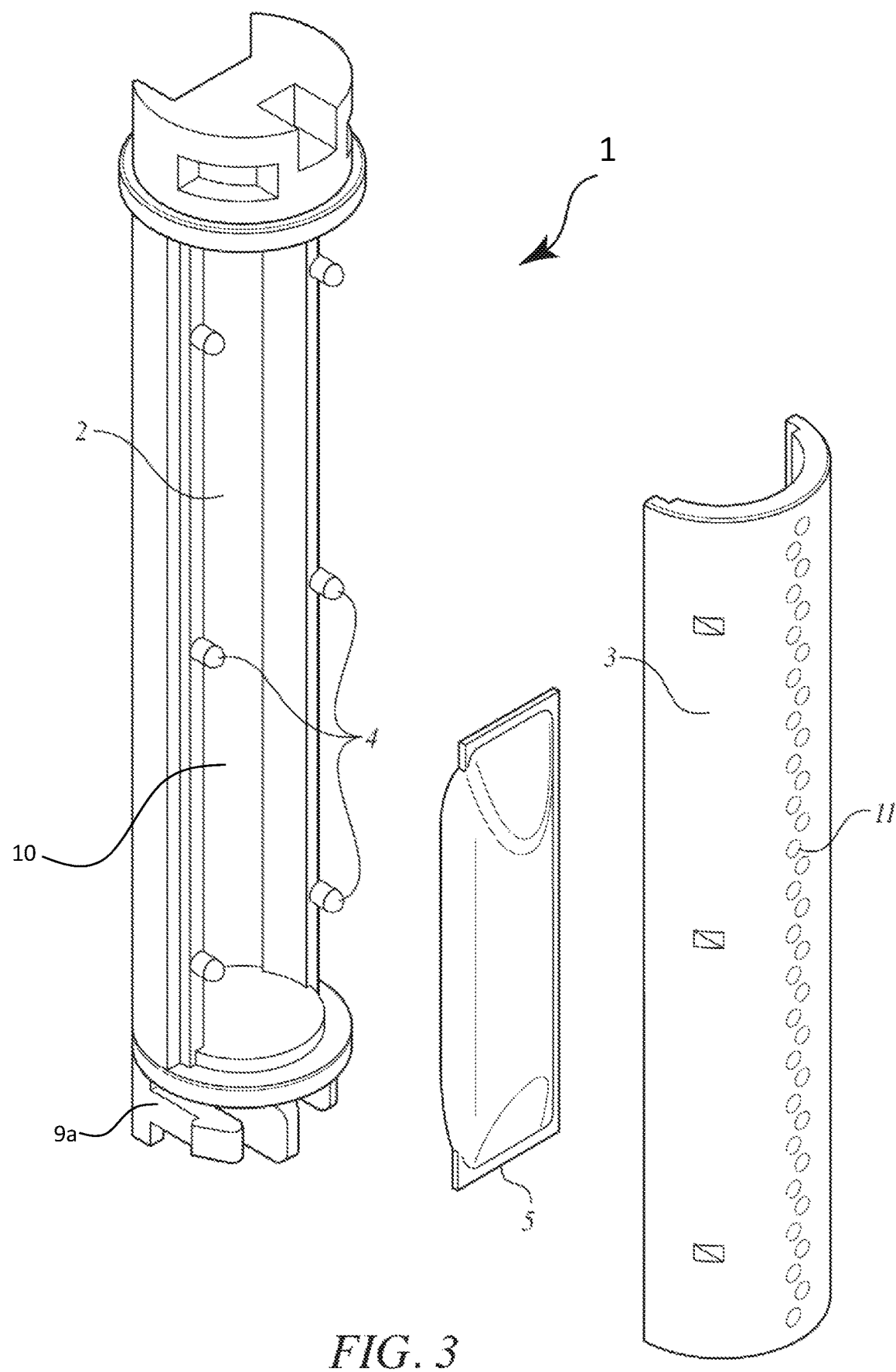
FIG. 3 shows another embodiment of a dissembled variable sampling device consisting of a sampling body, barrier door, and an example of a sorbent material that may be placed within the sampling body.

FIG. 2 and FIG. 3 each display an embodiment of a variable sampling device. Each variable sampling device 1 consists of a sampling body 2, a barrier door 3, and a space 10. In contemplated embodiments, the barrier door is removably connected to the sampling body. In FIG. 2 and FIG. 3, the barrier door 3 is may be fully removed to reveal the space 10 such that a sorbent 5 may be placed inside. In FIGS. 2 and 3, the barrier door 3 may be reattached to the sampling body 2 by pins on the sampling body 2 that connect with voids in the barrier door 3. In other embodiments, not shown, pins may be on the barrier door and connect with voids in the sampling body. In yet other embodiments, the barrier door may be removably connectable the sampling body by other means, for example, pins of a different shape or arrangement, a hinge mechanism, or any method that may be contemplated by one skill in the art the achieve a barrier door that may be removably connected to the sampling body. The sampling body in each of FIGS. 2 and 3 additionally has two connecting mechanisms 9a and 9b that enable attaching the depicted variable sampling device 1 to another variable sampling device (not shown).

While in use, a sorbent material 5 will be placed inside the variable sampling device and the holes 11 on the barrier door 3 will permit air flow and collection of particulate or chemicals in the air by the sorbent 5 inside. The number of holes, the pattern of holes, as well as the size of the holes may be altered to achieve a desired permeability or sampling rate. Typical permeability of the barrier could be from 0.5 to 130 milliliters per minute. Other rates are also possible. After a specified period of time, the sorbent can then be removed for analysis, and the sampling body refilled with fresh sorbent for another use.

FIGS. 1, 2, and 3 show the each variable sampling device having a cylindrical shape, however the shape is not limited to a cylinder, and the sampler may be in a variety of geometrical shapes, for example, rectangular, hexagonal, or octagonal. One of skill in the art would readily recognize materials form which the sampling body and barrier door may be made. Suitable materials would be any that may withstand environmental conditions and do not degrade when wet, for example, plastic.

An exemplary definition of a sorbent or a sorbent material is the same as commonly used in the art. For example, a sorbent may be a material that can adsorb or absorb target contaminants to or within the surface of the sorbent material. The sorbent material may be a variety of materials, and in some embodiments, may be obtained commercially. Some of the sorbent and other materials that can be in the containers include carbon-based sorbents, silica-based sorbents (e.g., silica gel), polymeric sorbents and resins, resins based on diatomaceous earth, or any other material known to absorb or adsorb air contaminants. Examples of suitable carbon-based sorbents include, but are not limited to, activated carbon, activated charcoal, graphitized carbons (e.g. Carbopack™ X), carbon molecular sieves, synthetic carbon (e.g., ANASORB® 747, including silica-treated ANASORB® 747), other treated or modified charcoals or carbons, and combinations thereof. One example of a resin based on diatomaceous earth is CHROMOSORB® resins. Examples of suitable polymeric sorbents and resins include, but are not limited to, copolymers of styrene-divinylbenzene (e.g., XAD®️ resins such as XAD®-2), CHROMOSORB® resins, polymers based on 2,6-diphenyl-p-phenyleneoxide (e.g., TANAX® resins), and combinations thereof.

CHROMOS ORB is a registered trademark currently owned by Imerys Minerals California, Inc. Corporation Delaware 1732 North First Street, Suite 450 San Jose Calif. 95112. It can be purchased from Advanced Minerals Corporation. XAD is a registered trademark currently owned by Rohm And Hass Company, a Delaware corporation, 1732 North First Street, Suite 450 San Jose Calif., 95112. TENAX TA is a registered trademark currently owned by Buchem B.V. Corporation Netherlands at Minden 60 7327 Aw Apeldoorn Netherlands. ANASORB is a registered trademark of SKC, Inc. Corporation Pennsylvania at 863 Valley View Road, Eighty Four, Pa. 15330 and can be purchased directly from SKC. Carbopack X is a product of Sigma Aldrich.

The overall size, shape, and amount of the sorbent should be such that it fits inside the sampling body without hindering attachment of the barrier door to the sampling body. In some embodiments, the sorbent medium may optionally be contained within a pouch. This may be particularly useful when the sorbent material is loose, granular, or comprised of particulates. One of skill in the art would readily recognize compatible containers or pouches, for example they may be mesh and/or made of stainless steel, nylon, Teflon, or any other compatible material. One of skill in the art will be familiar with the different kinds and forms in which sorbents are available as well as the appropriate sorbent to use for sampling a particular contaminant.

Figure 4:
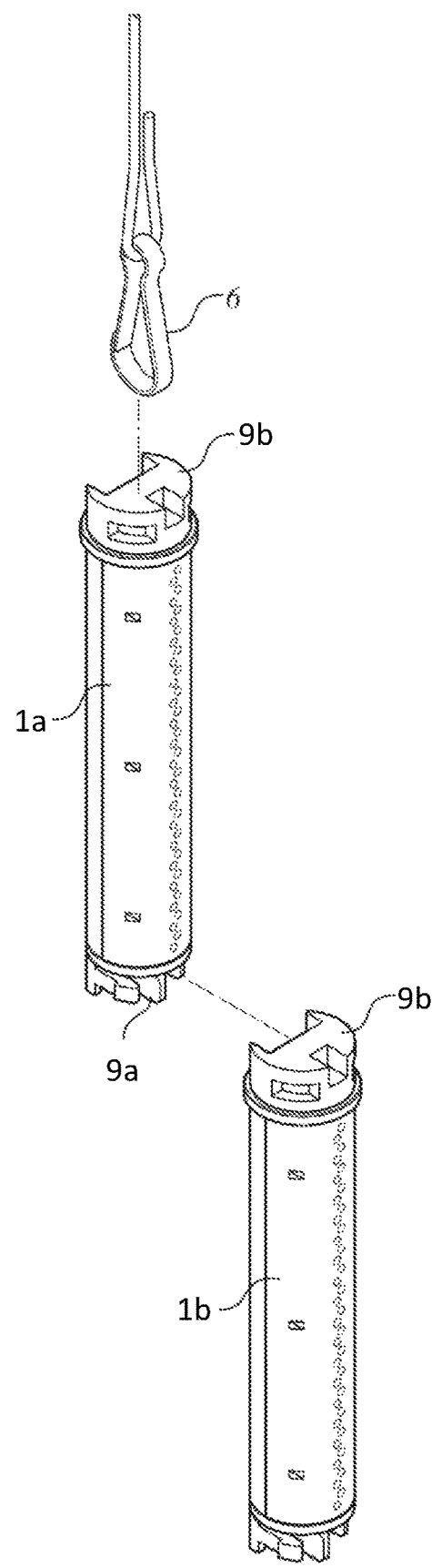
FIG. 4 shows that sampling bodies may be joined together, in one embodiment, end-to-end by a male-type interlocking mechanism on the bottom of one sampling body and a female-type interlocking mechanism on the top of another sampling body.

FIG. 4 is an exemplary illustration depicting the use of connecting mechanisms 9a and 9b to attach variable sampling device 1a to variable sampling device 1b to easily be attached to one another. While the connecting mechanism in FIG. 4 is shown as a male-type mechanism 9a that interlocks with a female-type mechanism 9b, any interlocking connecting mechanism is contemplated as within the scope of this invention. The individual connecting mechanisms 9a and 9b of FIG. 4 are attached to the top and bottom of each sampling body. However, placement at a different location on the sampling body is also contemplated as within the scope of the invention. By varying the placement of the connecting mechanism components on each sampling body, the orientation of attachment of separate variable sampling devices may be varied. For example, the variable sampling devices as shown in FIG. 4 are cylindrical having a long central axis and they are attached about this axis, end to end. This orientation may be particularly useful in applications where one or more variable sampling devices are fed down a hole for collecting gaseous or particulate samples. In other embodiments, the variable sampling devices may be placed side by side.

Figure 5:
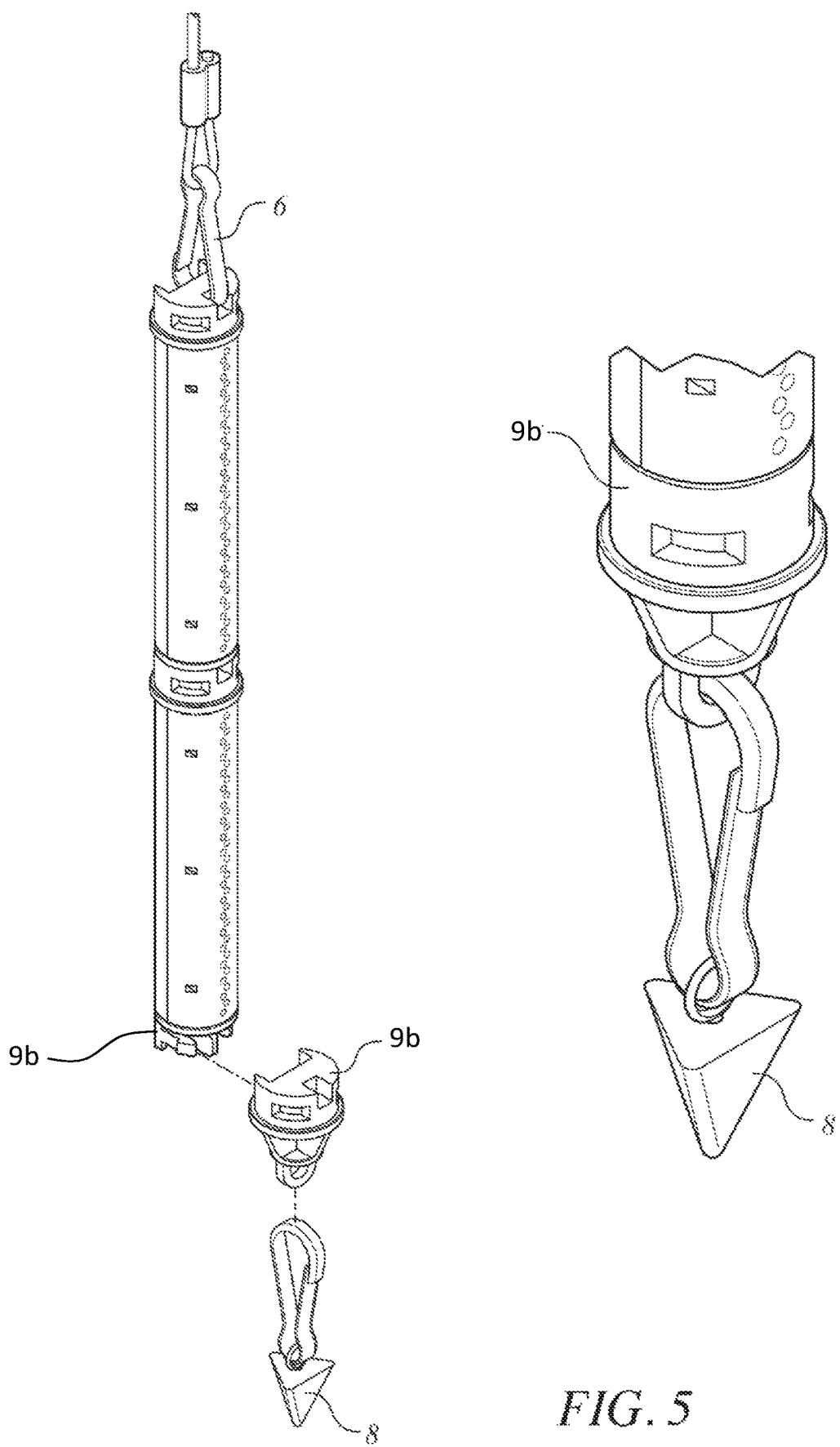
FIG. 5 illustrates that other components may be attached to each sampling body, for example, a clip to hang the variable sampling device or suspend something, such as a weight, from the bottom of the variable sampling device.

Optionally, other components may be attached to a sampling body by the same connection mechanisms utilized to connect sampling bodies. For example, FIG. 4 shows that a clip 6 may be attached to the male-type mechanism 9a on the top of one of the sampling bodies to allow the sampling body to hang or be attached to a structure. In another example, FIG. 5 shows that the male-type mechanism 9a on the bottom of one of the sampling bodies may be interlocked with a piece having a female-type mechanism 9a attached to another object, for example, a weight 8.

When considering two or more variable sampling devices, a different sorbent may be placed in each. Further, barrier doors with different permeabilities may be used with each. Thus, by attaching two or more variable sampling devices together, each with a unique sorbent and permeability, it is possible to collect a variety of environmental samples from the same soil sample and the same sampling period.

As described herein, the variable sampling device may be useful in sampling in a narrow space, for example, a hole in the ground or down a pipe. The area may be sampled, for example, by inserting one or more of these sampling bodies, connected end-to-end, down the hole.

Figure 6:
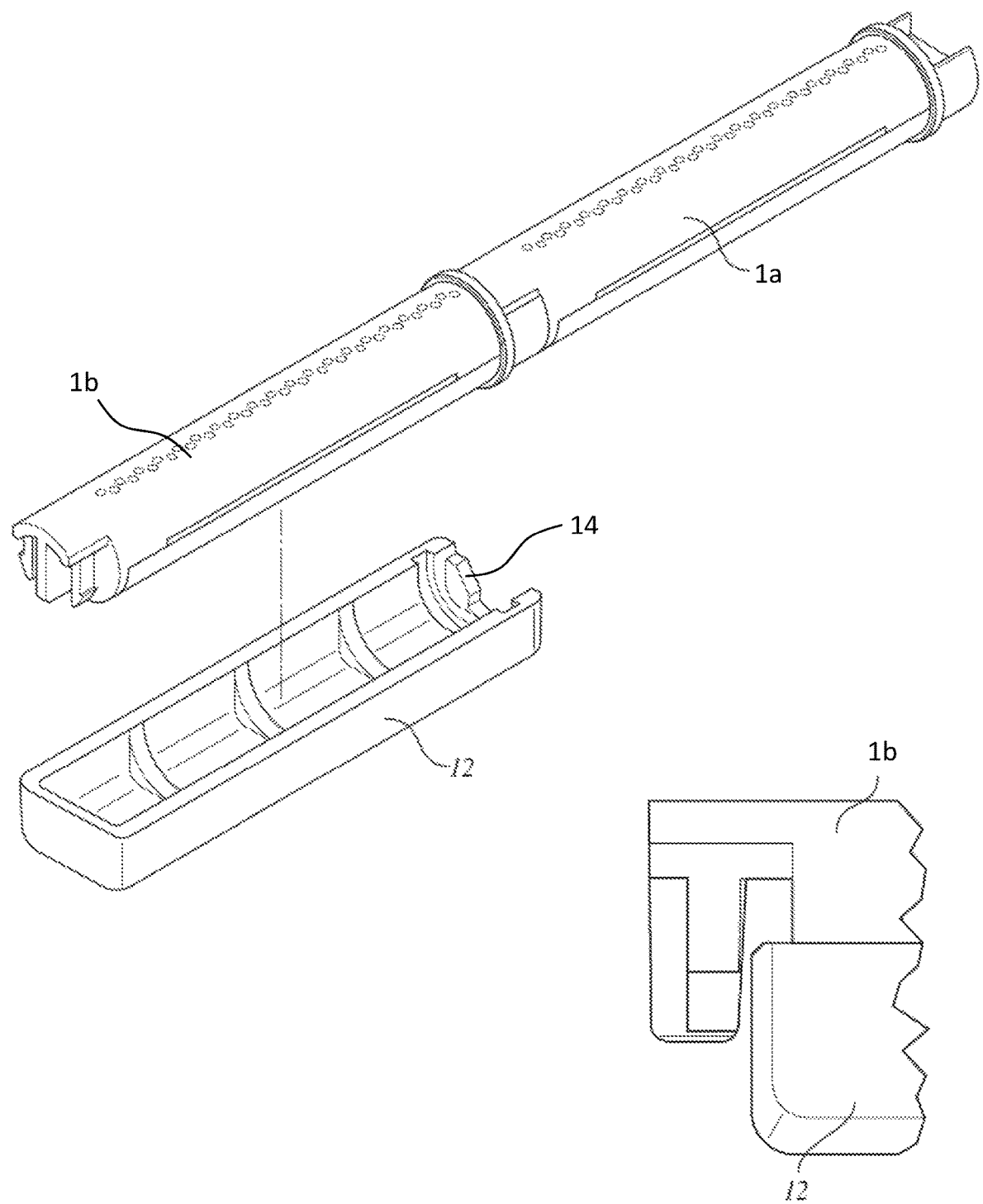
FIG. 6 illustrates a tool that may be used to disconnect adjacent sampling bodies from each other.
Figure 7:
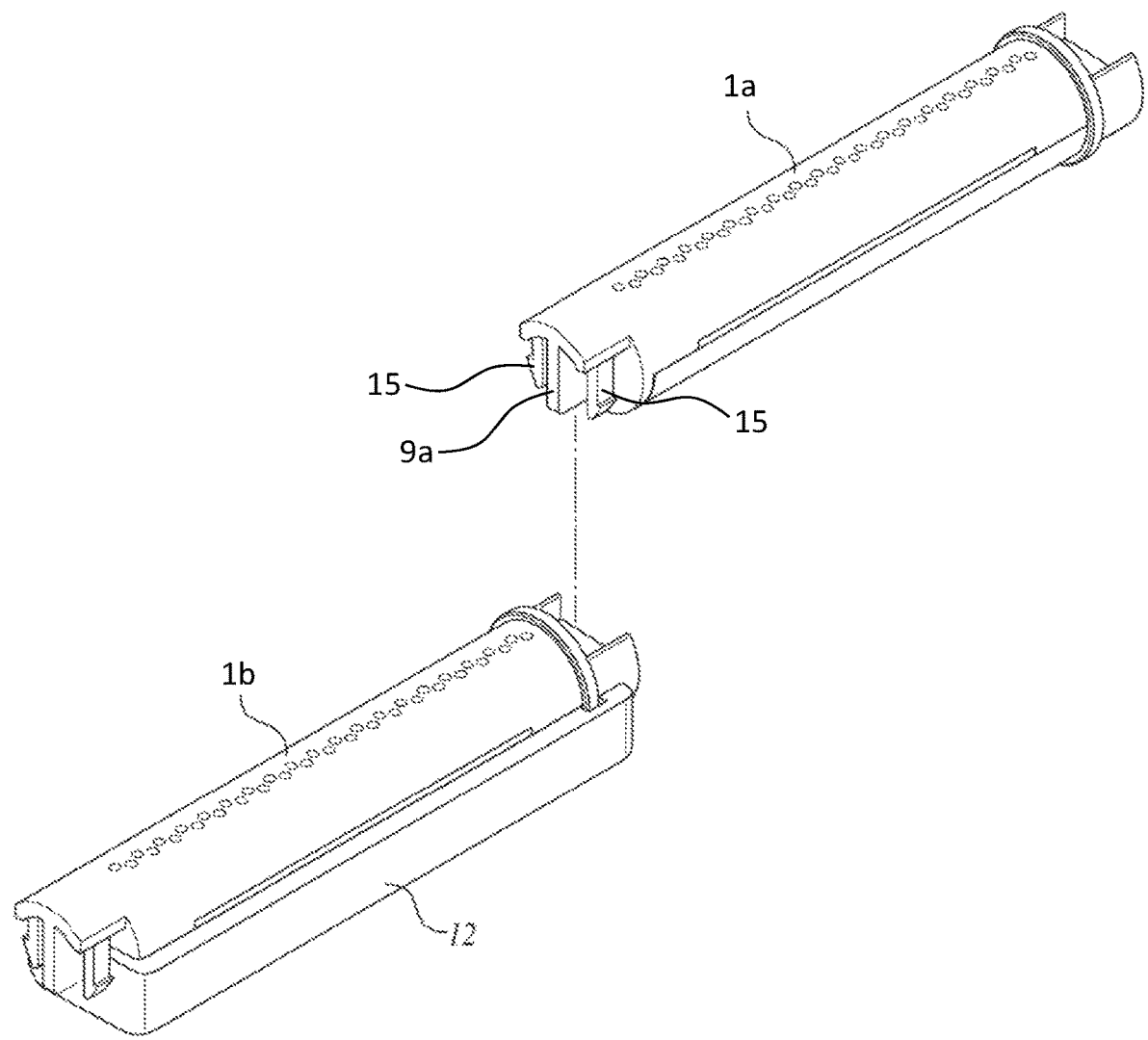
FIG. 7 illustrates use of the tool on a sampling body to disconnect an adjacent sampling body.

In another aspect, the present invention also encompasses a tool 12 to disconnect sampling bodies of each variable sampling device from each other. This process is exemplified in FIGS. 6 and 7. The tool 12 may be attached to one sampling body 1b which in turn, facilitates detachment of an adjoining sampling body 1a. This may be accomplished by lining up one of the variable sampling devices with the tool 12 as shown in FIG. 6, then pressing the variable sampling device into the tool. When this manipulation is performed, the tool's angled surfaces 14 will depress catches 15 on the adjoining mechanism 9a of the adjoining variable sampling device 1a and allow the variable sampling devices to be separated. This is shown in FIG. 7. While FIGS. 6 and 7 illustrate this tool for use on sampling bodies that are interlocked end-to-end, a similar tool can be employed for sampling bodies in different orientations.

Figure 8:
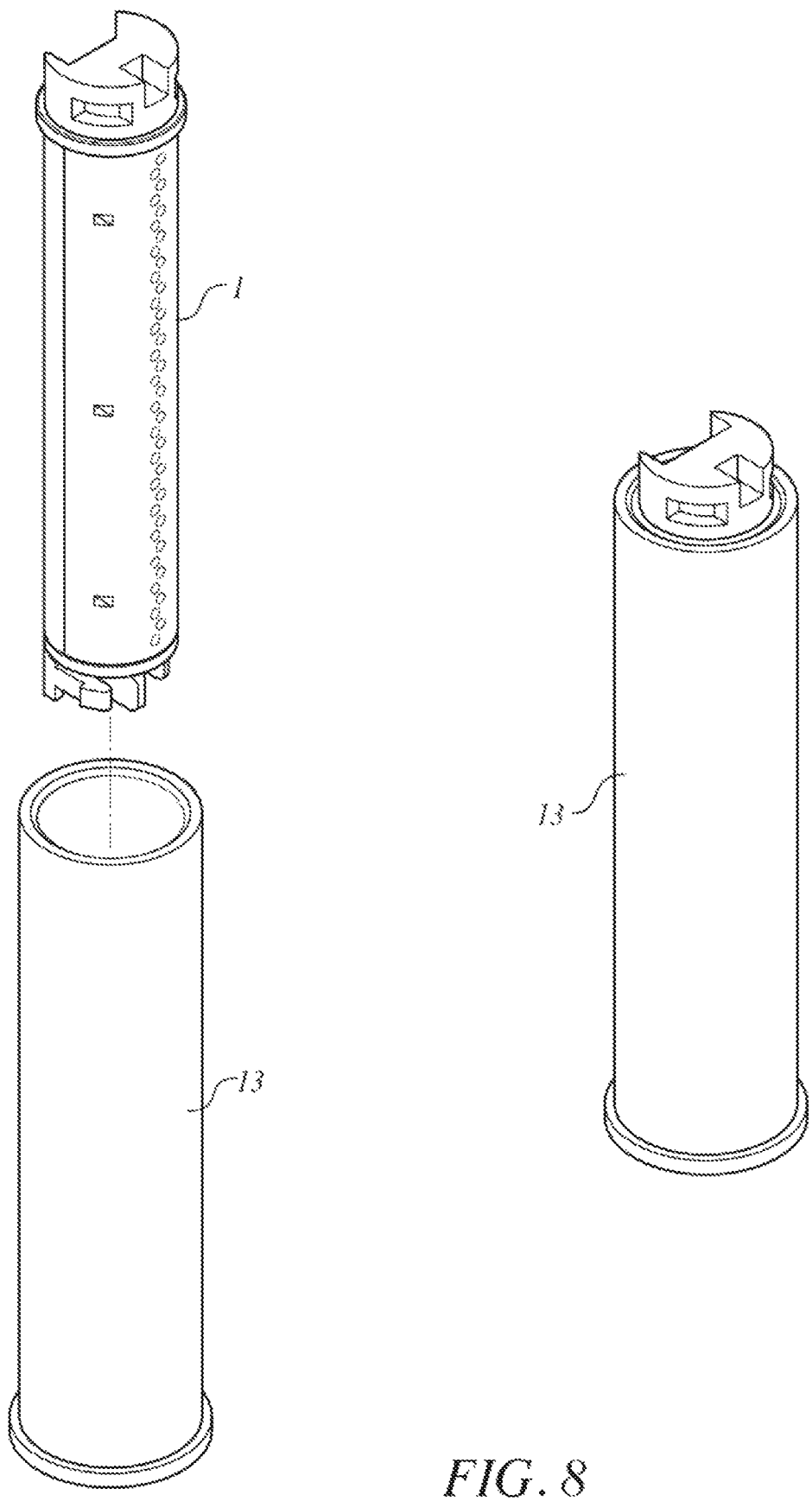
FIG. 8 illustrates the use of a sleeve to seal a sampling body for transportation prior to analysis of the sorbent inside.

It is contemplated as within the scope of the invention that removal of the sorbent may be done at the site of sampling or may be done at the site of analysis. For embodiments where sorbent will be removed at the analysis site, the present invention also encompasses a sleeve 13 to seal sampling bodies for transportation prior to analysis of the sorbent inside. FIG. 8 illustrates one embodiment of the sleeve 13 that may be used for cylindrical sampling bodies. The sleeve 13 fits over the sampling bodies such that it seals the sampling bodies from the outside environment and does not allow any air or other material to pass through any holes in the sampling bodies. In some embodiments the sleeve may incorporate gaskets or seals in order to create an airtight seal around the variable sampling device. After transport to the analysis site, the sleeve may be removed without damaging the variable sampling device. Thus the sampling device is reusable.

The present invention also provides a method for sampling using a variable soil sampling device as described herein. One or more variable sampling devices may be attached to each other by interlocking connecting mechanisms and sorbent material may be placed in each of the variable sampling devices by engaging the barrier door top reveal a space inside. After placing the sorbent material inside, the door may be replaced. Optionally, the sorbent material may be placed in each variable sampling device prior to attaching variable sampling devices together. The one or more variable sampling devices may then be exposed to the desired sampling environment. A rope, chain, or string may be attached to a sampling body of a variable sampling by a hook or clasp as illustrated in FIG. 1, FIG. 4, and FIG. 5. This may aid in placing the one or more variable sampling devices down a hole or a pipe. Optionally, a weight may be attached, as illustrated in FIG. 5, to aid the process of device placement.

The present invention provides a highly versatile device and method for soil sampling in that a wide variety of sorbents may be employed while, at the same time, the uptake rate of the barrier doors and arrangement of the sampling bodies can be changed and varied almost infinitely. Sampling bodies in a range of very high and very low permeability can be employed while the chambers can contain the same or different sorbent materials.

The systems, apparatus, and methods disclosed herein are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, apparatus, and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Although various example embodiments have been disclosed, a worker of ordinary skill in this art would recognize that certain modifications would come within the scope of this disclosure. For that reason, the following claims should be studied to determine the scope and content of this disclosure.

The invention claimed is:

1. A variable soil sampling device comprising:
   a) a first sampling body having an opening and a space where a first sorbent is placed;
   b) a first barrier door removably connected to the first sampling body comprising one or more holes in said first barrier door, said barrier door having a first permeability;
   c) a second sampling body having an opening and a space where a second sorbent is placed;
   d) a second barrier door removably connected to the second sampling body having a second set of one or more holes, said barrier door having a second permeability; and
   e) a first connector on the second sampling body that connects the second sampling body to the first sampling body,
   wherein the first permeability and the second permeability are different.

2. The variable soil sampling device as recited in claim 1, wherein the second sorbent is different than the first sorbent.

3. The variable soil sampling device as recited in claim 1, further comprising:
   a) a third sampling body having an opening and a space where a third sorbent is placed;
   b) a third barrier door removably connected to the third sampling body having a third set of one or more holes, said third barrier door having a third permeability; and
   c) a second connector on the third sampling body that connects to either the first sampling body or second sampling body.

4. The variable soil sampling device as recited in claim 3, wherein the third sorbent is different than either of the first sorbent or second sorbent.

5. The variable soil sampling device as recited in claim 3, wherein the first permeability, the second permeability, and the third permeability are different.

6. The variable soil sampling device as recited in claim 1, wherein the combined sampling body and barrier door is cylindrical.

7. The variable soil sampling device as recited claim 1, wherein the first sorbent is a sorbent material.

8. The variable soil sampling device as recited in claim 7, wherein the sorbent material is selected from the group consisting of carbon based resins and sorbents, silica-based sorbents, hydrophobic copolymer of styrene-divinylbenzene, resins based on diatomaceous earth, resins based on 2,6-diphenylene oxide, and combinations thereof.

9. The variable soil sampling device as recited in claim 8, wherein the carbon based resins and sorbents is selected form the group consisting of activated carbon, activated charcoal, graphitized carbons, carbon molecular sieves, synthetic carbon, silica treated synthetic carbon, and combinations thereof.

10. The variable soil sampling device as recited in claim 1, wherein the first sampling body and the second sampling body each have a long axis and are connected to each other end to end about said long axis.

11. A method of sampling soil, comprising:
   a) providing a first sorbent and a first soil sampling device, the first soil sampling device comprising a first sampling body with a first opening and a first space; a first barrier door removably connected to the first sampling body, the first door having one or more holes and a first permeability; and at least one connector on the first sampling body that is used to connect the first sampling body to a second sampling body on a second soil sampling device;
   b) providing a second sorbent and the second soil sampling device, the second soil sampling device comprising the second sampling body with a second opening and a second space, a second barrier door removably connected to the second sampling body, and the second barrier door having one or more holes and a second permeability, and at least one connector on the second sampling body that is used to connect the second sampling body to the first sampling body on the first soil sampling device;
   c) removing said first barrier door to reveal the first space;
   d) inserting the first sorbent into the first space;
   e) replacing the first barrier door to its original position; and
   f) exposing the first and second soil sampling devices to soil,
   wherein the permeability of the first barrier door is different than the permeability of the second barrier door.

12. The method as recited in claim 11, wherein the first sorbent is different than the second sorbent.

13. The method as recited in claim 11, further comprising the step of providing a third sorbent and a third soil sampling device, the third soil sampling device comprising a third sampling body with an third opening and a third space; a third barrier door removably connected to the third sampling body, the third door having one or more holes and a third permeability; and at least one connector on the third sampling body that is used to connect the third sampling body to the second sampling body or first sampling body prior to the exposing step.

14. The method as recited in claim 13, wherein the third sorbent is different than the first sorbent or the second sorbent.

15. The method as recited in claim 13, wherein the third permeability is different than the first or second permeabilities.

16. The method as recited in claim 11, wherein the soil sampling device is cylindrical.

17. The method as recited in claim 11, wherein the first sorbent is a sorbent material.

18. The method as recited in claim 17, wherein the sorbent material is selected from the group consisting of carbon based resins and sorbents, silica-based sorbents, hydrophobic copolymer of styrene-divinylbenzene, resins based on diatomaceous earth, resins based on 2,6-diphenylene oxide, and combinations thereof.

19. The method as recited in claim 18, wherein the carbon based resins and sorbents is selected form the group consisting of activated carbon, activated charcoal, graphitized carbons, carbon molecular sieves, synthetic carbon, silica treated synthetic carbon, and combinations thereof.

20. The method of claim 11, wherein the first and second soil sampling devices each have a central long axis and are connected to each other end to end about said long axis.

* * * * *